G. M. RICHARDS.
VALVE AND VALVE GRID SUPPORT FOR AIR COMPRESSORS.
APPLICATION FILED DEC. 6, 1915.
1,287,751. Patented Dec. 17, 1918.
3 SHEETS—SHEET 1.
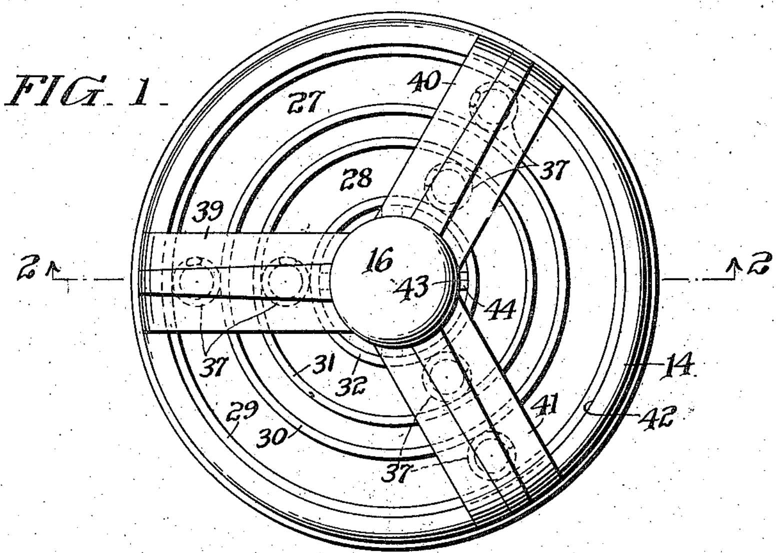
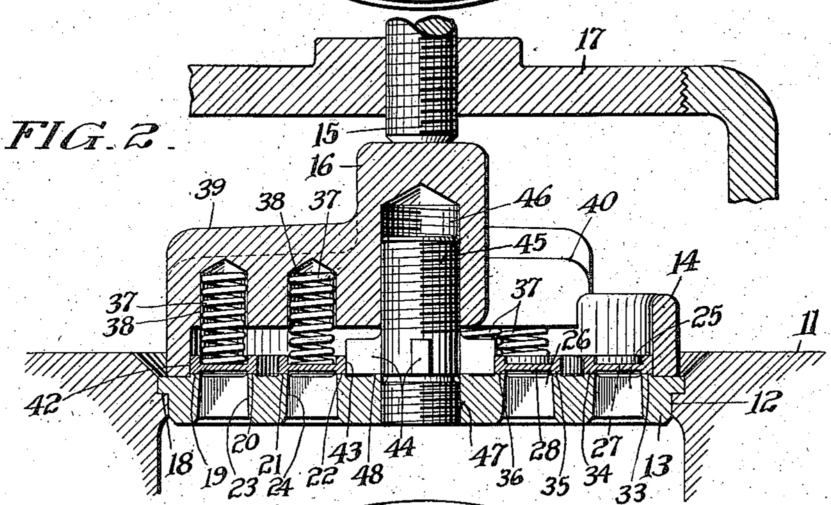
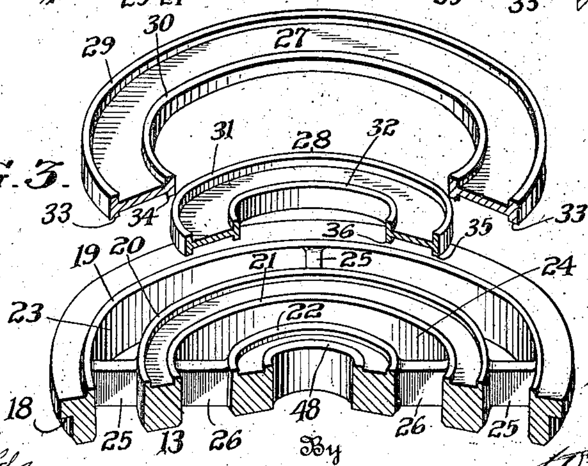
Inventor
George M. Richards
Witnesses
Gertrude Bader.
Thos. D. Moulds
By
Wm. Steell Jackson
Attorney G. M. RICHARDS.
VALVE AND VALVE GRID SUPPORT FOR AIR COMPRESSORS.
APPLICATION FILED DEC. 6, 1915.
1,287,751.
Patented Dec. 17, 1918.
3 SHEETS—SHEET 2.
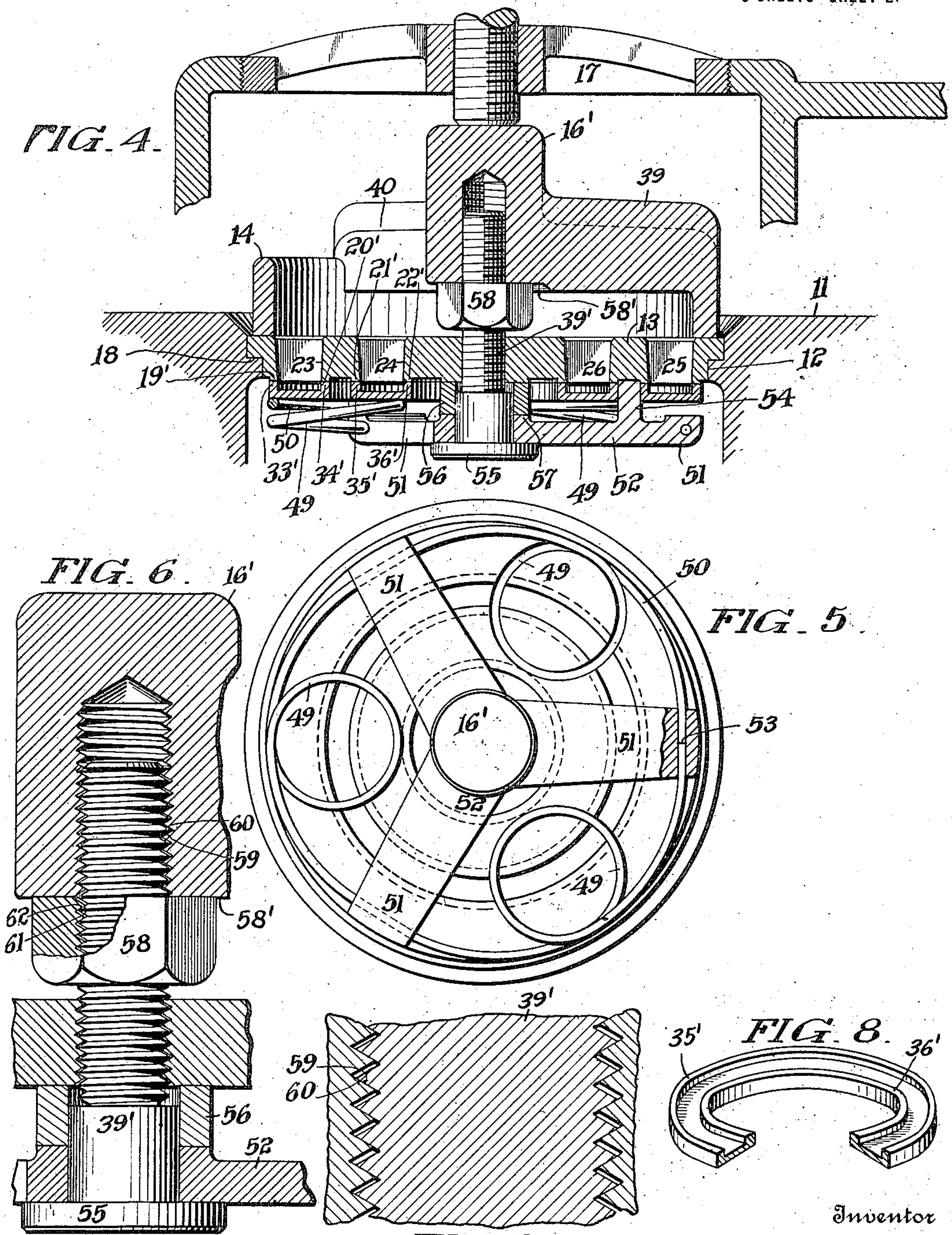
Inventor
George M. Richards
Witnesses
Gertrude Bader.
Thos. D. Mowlds
By
Wm. Steell Jackson
Attorney G. M. RICHARDS.
VALVE AND VALVE GRID SUPPORT FOR AIR COMPRESSORS.
APPLICATION FILED DEC. 6, 1915.
1,287,751 Patented Dec. 17, 1918
3 SHEETS—SHEET 3.
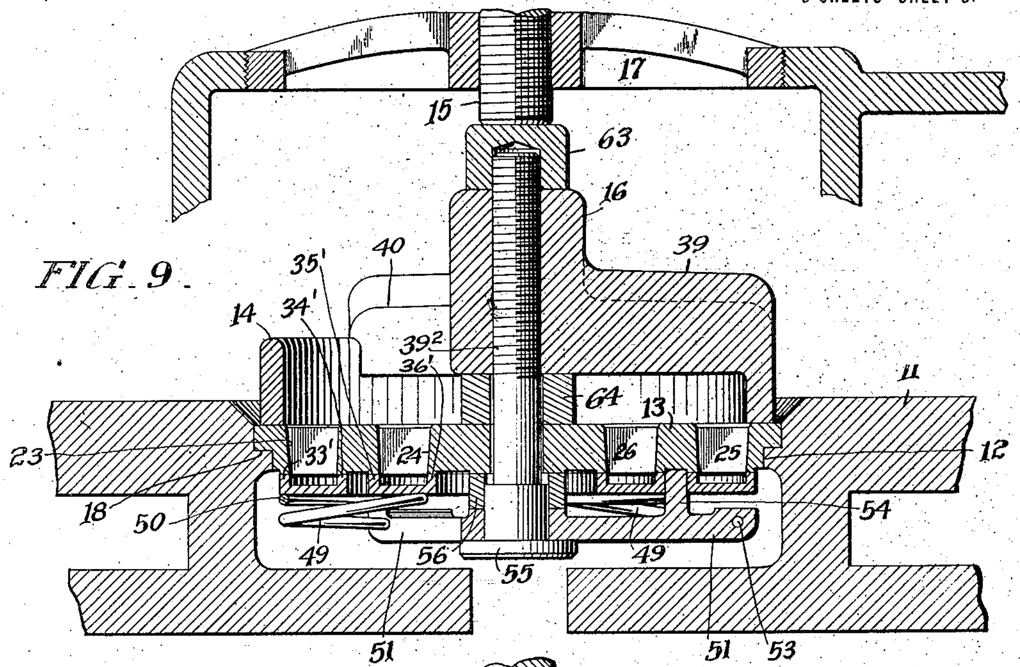
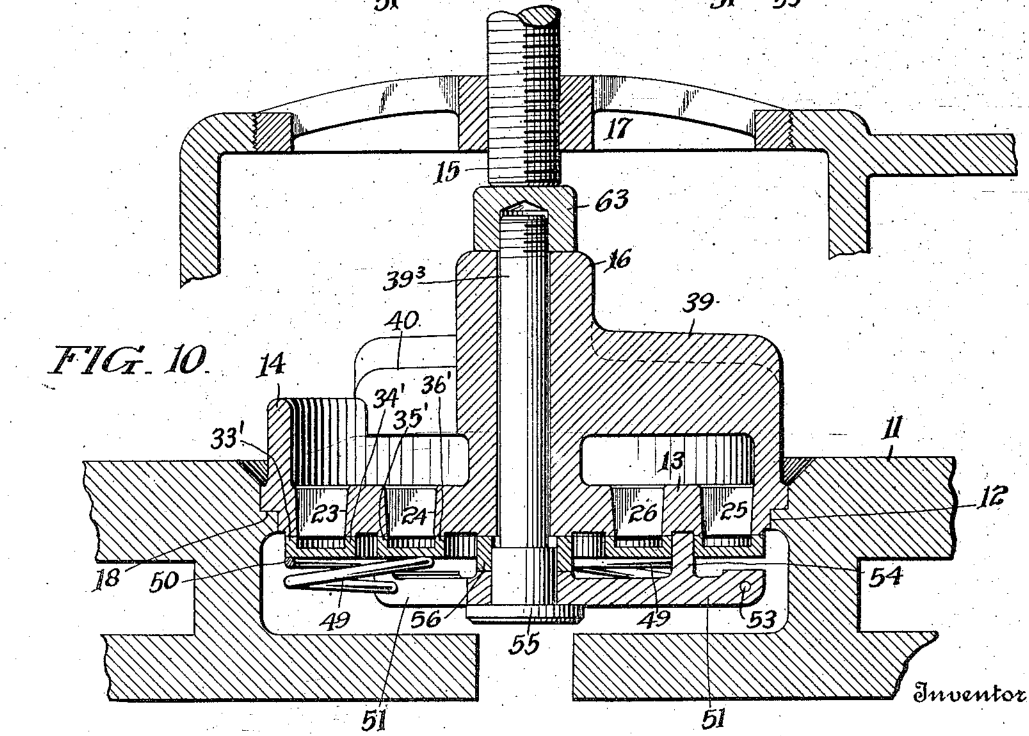
Inventor
Witnesses
Gertrude Bader
Thos. D. Reynolds
George M. Richards
By
Wm. Steell Jackson
Attorney

UNITED STATES PATENT OFFICE.

GEORGE M. RICHARDS, OF PHILADELPHIA, PENNSYLVANIA.

VALVE AND VALVE-GRID SUPPORT FOR AIR-COMPRESSORS.

1,287,751. Specification of Letters Patent. Patented Dec. 17, 1918.

Application filed December 6, 1915. Serial No. 65,205.

*To all whom it may concern:*

Be it known that I, GEORGE M. RICHARDS, a citizen of the United States, residing at 4438 N. 15th street, Philadelphia, in the county of Philadelphia and State of Pennsylvania, have invented a certain new and useful Valve and Valve-Grid Support for Air-Compressors, of which the following is a specification.

The purpose of my invention is to reduce the clearance of discharge valves for air compressors by reducing the thickness of the valve grid.

A further purpose of my invention is to support the grid of a removable air compressor valve unit at the center from a spider or other part of the unit, so that the grid may be stiffened or, for the same degree of stiffness, may be made of thinner material.

A further purpose of my invention is to reduce the clearance for air inlet valves and improve the spring closure for seating them.

Further purposes of my invention will appear in the specification and the claims hereof.

I have preferred to illustrate my invention by but a few of the many forms in which it may appear, selecting therefor forms which are practical, efficient and inexpensive and which at the same time well illustrate the purposes of my invention.

Figure 1 is a top plan view of the one form of my invention as applied to removable discharge air compressor valve units.

Fig. 2 is a central vertical section in the position shown by line 2—2 of Fig. 1, but showing additional parts.

Fig. 3 is a broken perspective view of the valve grid and two valves used therewith, shown in separated positions.

Fig. 4 is a section corresponding in position to Fig. 2 taken of a removable inlet valve unit and associated parts.

Fig. 5 is a top plan view broken in part, showing the spider, grid and valve structure of Fig. 4.

Figs. 6 and 7 are enlarged sectional views of portions of Fig. 4.

Fig. 8 is a broken perspective view of one of the valves shown in Figs. 4 and 5.

Figs. 9 and 10 are central vertical sectional views of modified forms of removable air inlet compressor valve units.

In the drawings, similar numerals refer to corresponding parts.

In air compressor work the clearance between the valves and the interior of the cylinder is waste space. This is true both of the inlet and discharge valves. They receive and retain air under pressure which should be expelled by the discharge stroke and which expands to fill part of the space in the cylinder in the place of additional inlet air which would otherwise flow in. The result is that the efficiency is lowered. My invention is designed to reduce the thickness of the grids used, to give them added stiffness against the pressures applied and to increase the efficiency of adequately flat inlet valve springs.

Applying my invention to the discharge valve shown in Figs. 1 to 3, I have shown the cylinder 11 apertured at 12 to receive a valve unit grid 13 and spider 14 held together and in place by a set screw 15, pressing upon the boss 16 of the spider. The screw is held in any suitable support 17. The grid is faced at 18 in the usual manner to seal tightly against the annular facing of the cylinder.

The valve grid carries seats 19, 20, 21, 22 surrounding ports 23 and 24 which are interrupted at intervals by radial webs 25, 26. The valves 27, 28 are flanged for stiffening purposes, preferably having most of the flanging above as at 29, 30, 31, 32 in order to reduce the volume of clearance air space upon the sides toward the seats, between flanges 33 and 34, 35 and 36. These latter flanges permit ready surfacing to coöperate with the valve seats.

The valves are normally forced down against the valve seats by springs 37, seated in recesses 38, in any suitable number of spider arms 39, 40, 41.

The guide for the valve 27 is the inner surface 42 of the rim of the spider, while the valve 28 is guided upon the inside by the outer edges 43 of wings 44 upon a stud 45, seated in a recess 46 in the boss of the spider and secured to the valve grid at 47.

The stud is shown as secured in the spider and also in the grid and is preferably inserted in the grid first and screwed home until the lower parts of the wings 44 engage with the annuar face 48 about the aperture in the center of the grid. In assemblage of the parts, the valves and springs may then be put in place with the parts inverted and the grid with the stud in it can be screwed into the boss of the spider until the proper contact of the rim of the spider with the grid has been secured.

It will be seen that the pressures upon the grid of the valve will be in a downward direction in Fig. 2 and that the support of the middle of the grid from the spider against strains in this direction, applying the principles applicable to the design of spans under load, makes it possible to reduce the thickness of the grid to less than half of that of the grid required if there be no support at the middle. Moreover, the tightening of the spider upon the stud until the rim of the spider presses the grid places the stud under tension and takes up any lost motion between the threads of the grid and spider on the one hand and the stud on the other, so that there is no lost motion before the grid receives the intended central support. This advantage will be pointed out in more detail in connection with Fig. 4 and the construction by which this lost motion between the threads is initially taken up as shown in the enlarged views in Figs. 6 and 7.

In the constructions seen in Figs. 4 to 10, inclusive, I have applied my invention to inlet valves, aiming to stiffen the grid and to reduce the thickness of the valve supporting structure. Taking up the form of Figs. 4 to 7, the spider is seen to be of the same general form as that in Fig. 1 but is not apertured to receive springs for the valves since these valves are located on the opposite or "base" side of the grid. The valves are of the same general form as in Fig. 1 but are correspondingly faced in an opposite direction. They are not flanged upon their under sides, as they make their sealing contact above by flanges 33′, 34′, 35′, 36′, engaging with flanges 19′, 20′, 21′, 22′ upon the under or "base" side of the grid.

The valves are held in place by coils 49 of a spring or springs 50 here shown as a single length of wire passed through the fingers 51 of a skeleton spring support 52, so that each coil or "spring" shall press upon both of the valves. The wire is shown as terminating with its ends together at 53.

The inner valve has a smaller area exposed to the fluid pressure than the outer valve. But, as the inner valve is further radially from the points of support of the springs than the outer valve, it will be evident that the leverage component of its turning moment upon the coils will be greater than that of the outer valve and that the inner valve may be made to lift uniformly with the outer valve or, preferably, even more readily than the outer valve. If this relative excess of leverage over difference in area subject to pressure exist in favor of the inner valve, it will open first and to a greater extent than the outer valve. This is a desirable, though not a necessary condition.

Both the inner and outer valves in this form are shown as guided by the ribs 54 of the valve support 52, which ribs rest between them and space the valves at the same time that they guide both of them.

The opening of the valves need not be great and may be limited by the stiffness of the spring applied, or by ultimate engagement with the adjoining surface of the support.

The pressure upon the grid is upward in Fig. 4, whereas the strain between the threads of the stud and those of the spider and grid would normally be downward in the spider and upward in the grid, leaving the lost motion between the threads to be taken up by movement of the grid before it received the support of the stud if a plain screw were used. In order to reverse the strains between the threads of the stud and those of the grid and spider I use the following construction:—

The lost motion between the valve grid and the stud 39′ is taken up by the same construction utilized to retain the valve support 52 in position. The stud is headed at 55, engaging the outer surface of the support and is screwed in place so as to bring pressure upon the head against the support and, by re-action, to take up the lost motion between the threads of the stud and the interior threads of the grid.

In the construction shown, and to avoid undue strain upon the support, I have used a spacer 56 to fill in the distance between the interior of the boss 57 upon the valve support and the face of the grid, in preference to filling this space by a collar integral with the support.

The means utilized in Fig. 4 for taking up the lost motion between the threads of the stud and the threads in the boss 16′ of the spider, is by means of a nut 58 upon the stud, bearing against the undersurface 58′ of the boss, preferably recessed at this point to give additional room for the nut.

The condition of the threads produced by these several means is best seen in Figs. 6 and 7 where the faces 59 of the thread upon the stud are firmly held against the faces 60 of the thread in the grid and the same faces also in the boss of the spider. Tendency of the grid to move upwardly with respect to the stud, is blocked by the maintained engagement of these faces of the stud and grid, while tendency of the stud to move bodily in toward the boss of the spider is prevented by the engagement of the faces 61 of the threads of the stud with the faces 62 of the threads of the nut and the tight pressure of the nut against the under surface of the boss.

In the forms shown in Figs. 9 and 10, the cylinder shown, valves, and associated parts and set screw to hold the valve units in position, are intended to be identical with those in Fig. 4, but there are differences in the spider and stud in both constructions and in the grid in Fig. 10.

The stud $39^2$ is passed directly through the boss 16 of the spider, preferably being threaded into it and being held in position by a lock nut 63 upon which the set screw 15 bears. The entire space between the spider and the lower face of the boss 16 is taken up by a collar 64, so that the parts are held solidly together between the head 55 and the end of the screw.

The form shown in Fig. 10 is identical with that in Fig. 9 in the functioning of the parts when secured, but the spider, grid and collar 64 are here formed in a single structure and the stud $39^3$ is not threaded into the other parts at all, but into the nut 63 alone.

The pressure upon the valve grid in the forms shown in Figs. 4 to 10 will be in the direction of the boss 16, placing the intermediate parts under compression. The intermediate parts fully support the grid at the center.

It will be evident that in all of the forms of my invention the valve grid is supported near to its center against strains in the direction in which the air pressure bears, shortening the span subject to air pressure to approximately half of its diameter and permitting the use of much thinner material than could otherwise be used.

While the compact flat form of spring shown in Figs. 4, 5, 9 and 10 is particularly desirable with inlet valves on account of its high efficiency and the short space axial of the grid which is taken up by it (the shortening of this clearance space being very desirable) it will be evident that this form of torsion coil flat spring may also be used with discharge valves and offers advantages in simplicity, efficiency, long life and reliability, wherever used.

Having thus described my invention, what I claim as new and desire to secure by Letters Patent is:—

1. In a device of the character stated, a valve grid, a valve therefor, a spider for the grid, engaging the grid at its circumference, and a threaded connection between the grid and spider having the lost motion between the threads taken up in the direction of the closing movement of the valve.

2. In a device of the character stated, an inlet air valve unit comprising a grid, valves on one side of the grid, springs engaging the valves, a support for the springs, a spider on the opposite side of the grid, engaging the grid at its circumference, and a connection between the grid and the spider, normally under compression and located centrally with respect to the grid.

3. In a device of the character stated, an inlet air valve unit comprising a grid, valves on one side of the grid, springs engaging the valves, a support for the springs, a spider on the opposite side of the grid, engaging the grid at its circumference, and a connection between the grid and the spider having its play in compressive direction taken up.

4. In a device of the character stated, a valve grid, a spider on one side of the grid, engaging the grid at its circumference, valves on the opposite side of the grid, springs for the valves, a support for the springs and a connection for holding the support to the grid and the grid to the spider, normally under tension in the parts lying in the grid and in the spider.

5. In a device of the character stated, a circular grid, valve structure on one side of the grid, a spider on the opposite side of the grid, the grid and spider being rigidly held away from each other close to the center and retaining means passing through the grid at the center and holding the valve construction in position.

6. In a device of the character stated, an integral grid and spider having rigid connection between them about the center, in combination with a valve structure on the opposite side of the grid from the spider and means for securing the valve structure in position.

7. In a device of the character stated, a grid having annular valve openings, separate annular valves engaging the openings, springs for the annular valves, a support for the springs, a guide for the valves carried by the support, a spider on the opposite side of the grid and a bolt passing through the support into the spider.

8. In a device of the character stated, a valve grid, annular valves of different diameter for the grid, a valve spring support and a spring for the valves engaging with the support at two points and at an intermediate point engaging with the valves.

9. In a device of the character stated, a valve grid, annular valves of different diameter for the grid, a valve spring support having arms and a spring for the valves engaging with the arms of the support and coiled at an intermediate point to engage with the valves.

10. In a device of the character stated, a valve grid, annular valves of different diameter for the grid, a valve spring support having arms and a spring for the valves engaging with the arms of the support and coiled at an intermediate point to engage with the valves at different distances radially from the points of engagement of the springs with the arms to provide different leverages and corresponding successive openings for the valves.

11. In a device of the character stated, a valve grid, a plurality of annular valves of different diameter therefor, a valve spring support connected with the middle of the valve grid and having radially extending arms and a wire spring engaging adjoining arms, coiled between the arms, extending inwardly toward the center of the support from the point of engagement and making contact with the valves.

12. In a device of the character stated, a valve grid, a plurality of annular valves of different diameter therefor, a valve spring support having radially extending arms and a wire spring engaging adjoining arms, coiled between the arms, extending inwardly toward the center of the support from the point of engagement and making contact with the valves and adapted to compensate for smaller area of interiorly located valves by providing them with a larger leverage.

GEORGE M. RICHARDS.

Witnesses:
Wm. Steell Jackson,
J. Lutheria Kauffman.